United States Patent Office 3,087,963
Patented Apr. 30, 1963

---

3,087,963
PREPARATION OF 1,12-DODECANEDIOIC ACID
Herbert K. Wiese, Cranford, and Samuel B. Lippincott, Springfield, N.J., assignors to Esso Research and Engineering Company, a corporation of Delaware
No Drawing. Filed Mar. 2, 1959, Ser. No. 796,299
3 Claims. (Cl. 260—526)

The present invention relates to new and improved processes for the preparation of 1,12-dodecanedioic acid. More particularly, this invention relates to a process wherein cyclododecanol, cyclododecanone, or cyclododecene is oxidized with aqueous nitric acid, in the presence of a controlled amount of a $C_2$–$C_5$ monocarboxylic acid solubilizer preferably acetic acid. Additionally, this invention relates to a preparation of 1,12-dodecanedioic acid wherein specifically cyclododecanone is oxidized with air in the presence of glacial acetic acid, and a controlled small amount of water.

It has now been discovered over the prior art processes that by adding a controlled amount of a $C_2$–$C_5$ monocarboxylic acid reaction modifier and solubilizer in the nitric acid oxidation of the $C_{12}$ cyclic alcohol, ketone, or olefin that a greatly increased selectivity of conversion to 1,12-dodecanedioic acid and a higher purity product can be obtained. Likewise over the prior art, air oxidation in the presence of glacial acetic acid process, it has now been discovered that radical improvement in yield of the desired 1,12-dodecanedioic acid is obtained by adding a controlled amount of water as a reaction modifier.

The starting materials of this invention are prepared from 1,5,9-cyclododecatriene which is obtained by trimerizing butadiene with alkyl metal type catalysts. The preparation of cyclododecatriene is described, for example, in Angewandte Chemie, vol. 69, No. 11:397 (June 7, 1957). Cyclododecatriene exists in four stereo isomers although only two have thus far been isolated. These are the cis, trans, trans (cis., tr., tr.) and the trans, trans, trans (tr., tr., tr.) isomers as shown by the formulas below.

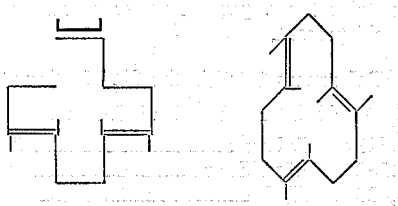

Cis., tr., tr. M.P., −18° C.   Tr., tr., tr. M.P. 34° C.

Throughout the specification it will be assumed that either of the isomers above represented or of the other isomers may be utilized or mixtures thereof. Cyclododecanol is prepared from cyclododecatriene (also described in the above cited reference) by first converting cyclododecatriene to the monoepoxide with, for example, acetaldehyde peracetate or hydrogen peroxide and then hydrogenating the epoxide to the alcohol. The ketone, cyclododecanone, may be prepared from this alcohol by dehydrogenation. The cyclododecene starting material of this invention may be prepared from the cyclododecatriene by selective hydrogenation directly to the monoolefin or by bromination with hydrogen bromide to the monobromo derivative followed by hydrogenation to the saturated compound and then dehydrohalogenating to cyclododecene.

The 1,12-dodecanedioic acid is of great value as a starting material in the manufacture of poly esters and of super poly amides. The suitableness of this material as a nylon 66 type intermediate is obvious. Thus, nylon 66 involves the condensation of adipic acid with hexamethylene diamine. Fiber derivatives using starting materials of the present molecular weight are now being widely commercially evaluated.

The prior art process over which the present invention provides large advantages involves the oxidation of cyclohexanone or cyclohexanol with nitric acid to adipic acid. Any attempt to use this technique for oxidizing cyclododecanone, cyclododecanol and cyclododecene results in very low selectivity to the desired $C_{12}$ dibasic acid, and difficulties in purification of the dibasic acid due to the insolubility of the $C_{12}$ cyclic starting material and straight chain product compounds in the oxidizing medium. Thus, when it was attempted to utilize only the nitric acid without a solubilizer a large amount of a yellow viscous oily material was obtained which caused yields of the desired material to be very low. Additionally, since dodecanedioic acid is very insoluble in the nitric acid medium of the prior art processes the prior art crystallization purification from lower molecular weight dibasic acids (obtained in the reaction) based on their being selectively more soluble cannot be obtained. Thus, in the prior art oxidation of cyclohexanol or cyclohexanone the product adipic acid is very soluble in the nitric acid oxidizing agent and thus could be recovered from the nitric acid by crystallization.

In the oxidation processes of the present invention it is contemplated that the following reaction conditions will be used. In the nitric acid plus reaction modifier process temperatures will be in the range of 50–100° C. and pressures will be in the range of 1 atmosphere to 10 atmospheres. Likewise, in the air oxidation process temperatures will be in the range of 70 to 150° C. and pressures will be in the range of 1 atmosphere to 20 atmospheres.

According to the present invention is has now been discovered that an improved process for oxidizing the $C_{12}$ cyclic ketone, alcohol, or monoolefin to the diacid is obtained by utilizing aqueous nitric acid having a concentration of 25–70 wt. percent, preferably 45–60 wt. percent as the oxidizing agent and a controlled amount of a $C_2$–$C_5$ monocarboxylic acid to solubilize the $C_{12}$ cyclic starting material and the straight chain diacid product in the oxidizing agent. Thus, the additon of this $C_2$–$C_5$ monocarboxylic acid greatly increases yields, rates of oxidation, and makes possible the crystallization from the reaction mixture of a purified 1,12-dodecanedioic acid. The preferred organic acid to be used is acetic acid. According to the present process more than 3 moles of nitric acid per mole of $C_{12}$ cyclic starting material, preferably 3–10 moles should be used to obtain complete oxidation. The amount of organic acid solubilizing agent to be added expressed as wt. percent of aqueous nitric acid present is in the range of 5 to 50 wt. percent preferably 10 to 30 wt. percent. As an example, when using 70 wt. percent nitric acid sufficient acetic acid may be added to reduce the nitric acid concentration to about 54% by weight based on solubilizer and aqueous nitric acid. From another standpoint in this example the acetic acid concentration based on the total reaction mixture will be 23 wt. percent.

In the oxidation of cyclododecanone with an air glacial acetic acid containing from 1 to 20 wt. percent preferably 2 to 10 wt. percent of water is used as solvent. According to the prior art it would be expected that only glacial acetic acid should be used for this oxidation. Thus, it is known that water ordinarily slows the rate of oxidation and in some cases completely inhibits it. It has now been found that where only glacial acetic acid in the absence of water is used low yields of the 1,12-dodecanedioic acid are obtained. In the presence of 1–20 wt. percent water based on glacial acetic acid greatly improved yields are obtained.

For the purpose of illustrating the present invention the following laboratory preparations of the alcohol, the ketone and four methods for the preparation of the diacid are presented in Examples 1, 2, 3, 4, 5 and 6.

EXAMPLE 1

Hydrogenation of Cyclododecatriene Monoepoxide

A pressure bomb was charged with 400 g. of cyclododecatriene monoepoxide and about 5 g. of Raney nickel. After flushing with nitrogen and then with hydrogen, the rocking bomb was heated gradually under 1000 pounds hydrogen pressure. Rapid adsorption of hydrogen took place at 80–100° C., about ⅔ of the hydrogen being adsorbed, i.e. the unsaturated epoxide had been converted to the saturated epoxide. Hydrogenation was completed at 150° C. and 1000 pounds pressure, thus converting the epoxide to the alcohol. The bomb was cooled and opened. It was found to contain a solid product of mainly cyclododecanol. It was distilled to remove a small amount of cyclododecane. The cyclododecanol which remained as bottoms melted at 73°. Recrystallization gave a product melting at 78°. Literature gives 80° as the melting point of cyclododecanol. (Helv. Acta Chem. 32, 262 (1949).) The yield was about 80%.

EXAMPLE 2

Dehydrogenation of Cyclododecanol to Cyclododecanone

The cyclododecanol (370 g.) was mixed with Raney nickel (5 g.) and heated with stirring to 177°. Hydrogen started to evolve at 125° and was completed at about 170°. The product was distilled and recrystallized from cyclohexane. It melted at 61°. Literature gives 59° as the melting point. (Helv. Acta Chem. 39, 356 (1956).)

EXAMPLE 3

$HNO_3$—Acetic Acid Oxidation of Cyclododecanone to 1,12-Cyclododecanedioic Acid To 130 gms. of 54% nitric acid was added 26 gm. of cyclododecanone. The temperature was then raised to 70° C. and the two phase systems vigorously stirred. A small amount of oxidation occurred as evidenced by the nitric oxide fumes. After two hours stirring the dibasic acid formed was contaminated by a great deal of oily product. Then 25 gms. of glacial acetic acid was added and the oxidation continued. After an additional three hours the two phase system became homogeneous. The reaction mixture was then cooled to room temperature and the precipitated acid filtered off, washed with water and dried. The acid which amounted to about 75% of theoretical had an acid number of 8.56 meq./gm. (theoretical 8.70 meq./gm.).

EXAMPLE 4

Air Oxidation of Cyclododecanone to 1,12-Dodecanedioic Acid

| Charge, gms.: | | |
|---|---|---|
| Cyclododecanone [a] | 200 | 151.4 |
| Glacial Acetic | 100 | 100.0 |
| Manganous Acetate | 0.5 | 0.5 |
| Water | 0.0 | 3 |
| Reaction Conditions: | | |
| Temperature, ° C | 90–105 | 90–105 |
| Length of Run, hours | 6 | 7 |
| Oxygen Take-Up, Gms | 20 | 21.5 |
| Percent Conversion to Dibasic Acid, Based on Oxygen Take-Up | 42 | 60 |
| Acid No. on Product [b] | 8.35 | 8.15 |
| Melting Point of Acid, ° C | 124–125 | 124–125 |

[a] Purity—90% ketone, 10% cyclododecane.
[b] Acid number expressed as meq./gm. Acid recovered from reaction mixture by crystallizing acid out at 25° C.

EXAMPLE 5

$HNO_3$—Acetic Acid Oxidation of Cyclododecanol to 1,12-Cyclododecanedioic Acid To a mixture consisting of 1375 gm. of 70% nitric and 400 gm. of glacial acetic acid was added 419 gm. of cyclododecanol over a 3½ hour period. The temperature was maintained between 65 to 70° C. The reaction mixture was then cooled to room temperature and the 1,12-dodecanedioic acid filtered off. It was washed several times wtih water and dried. A total of 430 gm. of acid (82% yield) was recovered. It had an acid number of 8.63 meq./gm. (theoretical 8.70 meq./gm.).

EXAMPLE 6

$HNO_3$—Acetic Acid Oxidation of Cyclododecene to 1,12-Cyclododecanedioic Acid Cyclododecene (189 gm.) was added slowly to a mixture of 678 gm., 70% $HNO_3$ and 268 gm. glacial acetic acid at 65° C. The entire reaction mixture was added to a liter of water and the 1,12-dodecanedioic acid filtered off. A total of 220 gm. of of acid product was recovered.

What is claimed is:

1. A process for the preparation of 1,12-dodecanedioic acid which comprises oxidizing cyclododecanone with air at temperatures in the range of 70–150° C. and pressures in the range of 1 to 20 atmospheres in the presence of a solvent composition consisting essentially of glacial acetic acid containing from 2–10 wt. percent of water, said wt. percent of water being based on the glacial acetic acid present.

2. The process of claim 1 in which oxidation is carried out in the presence of a manganous acetate catalyst.

3. The process of claim 2 in which the glacial acetic acid contains 3 wt. percent water based on the glacial acetic acid present.

References Cited in the file of this patent

UNITED STATES PATENTS

| 1,961,623 | Pelton | June 5, 1934 |
| 2,193,562 | McAllister | Mar. 12, 1940 |
| 2,354,683 | Hull | May 1, 1942 |
| 2,285,914 | Drossbach | June 9, 1942 |

OTHER REFERENCES

Fieser: "Organic Chemistry," 3rd ed., 1956, p. 68.
Noller: "Organic Chemistry," page 764 (1951).
Groggins: "Unit Processes in Organic Synthesis," 4th ed., pages 433 and 441 (1952).
(Copies in Library.)